(12) United States Patent
Anderson et al.

(10) Patent No.: US 10,656,967 B1
(45) Date of Patent: May 19, 2020

(54) ACTOR AND THREAD MESSAGE DISPATCHING

(71) Applicant: Amazon Technologies, Inc., Seattle, WA (US)

(72) Inventors: Cheyne William Anderson, Bellevue, WA (US); Adam Julio Villalobos, Kirkland, WA (US); Qiang Fan, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 15/935,451

(22) Filed: Mar. 26, 2018

Related U.S. Application Data (63) Continuation of application No. 14/804,521, filed on Jul. 21, 2015, now Pat. No. 9,959,143.

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4881* (2013.01)

(58) Field of Classification Search
CPC ............................. G06F 9/5028; G06F 9/4881
See application file for complete search history.

(56) References Cited

U.S. PATENT DOCUMENTS

| | | | |
|---|---|---|---|
| 6,519,568 B1 | 2/2003 | Harvey | |
| 6,658,485 B1 | 12/2003 | Baber et al. | |
| 7,401,112 B1* | 7/2008 | Matz | G06F 9/5038 379/265.02 |
| 9,329,901 B2* | 5/2016 | Sterling | G06F 9/505 |
| 2012/0246652 A1 | 9/2012 | King-Smith et al. | |
| 2012/0303999 A1* | 11/2012 | Calder | G06F 11/1471 714/6.3 |
| 2014/0330896 A1 | 11/2014 | Addala et al. | |
| 2015/0135183 A1* | 5/2015 | Kipp | G06F 9/46 718/103 |
| 2015/0242254 A1* | 8/2015 | Kim | G06F 9/4831 711/151 |

\* cited by examiner

*Primary Examiner* — Camquy Truong
(74) *Attorney, Agent, or Firm* — BakerHostetler (57) ABSTRACT

Techniques for actor and thread message dispatching are described herein. In some examples, a computing system may include multiple actors and multiple processing threads. Upon receiving an incoming message associated with one of the actors, a dispatching component may select one of the multiple processing threads within the computing system to which to dispatch the message for processing. If the associated actor is already assigned to one of the processing threads, then that processing thread may be selected for processing of the message. By contrast, if the associated actor is not already assigned to one of the processing threads, then a processing thread may be selected based on various factors, such as a set of priorities associated with the processing threads.

20 Claims, 8 Drawing Sheets

| Actor Assignment Table 150 | | | |
|---|---|---|---|
| Actor Identifier 310 | Assigned Thread Identifier 320 | Actor En-queue Counter 330 | Actor De-queue Counter 340 |
| 100A | 180B | 9 | 6 |
| 100B | 180A | 7 | 2 |
| 100C | Not Assigned | 4 | 4 |
| . . . | | | |
| 100N | 180A | 4 | 3 |

ACTOR AND THREAD MESSAGE DISPATCHING

CROSS-REFERENCE TO RELATED APPLICATIONS

This application is a continuation of U.S. application Ser. No. 14/804,521 filed on Jul. 21, 2015, now U.S. Pat. No. 9,959,143, the disclosure of which is hereby incorporated by reference in its entirety.

BACKGROUND

In some cases, it may be advantageous to perform computing operations using an actor-based model in which multiple actors execute within a computing system, and individual actors receive and respond to various messages. In some examples, such computing systems may include multiple different processing cores that may be associated with multiple different processing threads. Such systems may provide many benefits, such as allowing various computing operations to be performed in parallel with one another, which may allow efficient utilization of the multi-core processing power of modern hardware. However, the employment of such systems may often involve a number of inherent challenges, such as those related to efficiently scheduling and dispatching message processing among the various multiple processing threads. In particular, when messages are not efficiently scheduled and dispatched, one or more processing threads may become overloaded with work, while one or more other available processing threads may remain idle. Moreover, various unexpected delays or errors may sometimes occur even after messages are dispatched, which may result in further overloading of various processing threads. Thread overloading and other related inefficiencies may result in reduced processing speed and degraded system performance, and may waste opportunities to fully utilize the processing power of modern computer hardware.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Techniques for actor and thread message dispatching are described herein. In some examples, a computing system may perform various operations using a set of multiple actors. The actors may be modules, components, or other entities that may be capable of performing various computational tasks. For example, actors may receive and respond to various messages and may also send messages to other actors. In some examples, actors may be capable of performing various operations concurrently or partially concurrently with other actors. Thus, in some examples, the use of multiple actors may allow efficient utilization of the multi-core processing power of modern hardware. In some examples, actors may sometimes be employed to perform operations associated with graphical objects in video games and other electronic media, operations associated with electronic mail, web services, and other operations.

In addition to multiple actors, a computing system may also include multiple processing threads. Also, in some examples, the computing system may include multiple processing cores, and each of the multiple processing threads may be associated with a respective one of the multiple processing cores. The computing system may, for example, receive various messages for processing, and each of the messages may have an associated actor that receives and responds to the message. Upon receiving each message, a dispatching component may select one of the multiple processing threads within the computing system to which to dispatch the message for processing. In some examples, to select a particular processing thread, it may be determined whether the actor associated with the message is already assigned to one of the processing threads. An actor may be assigned to a processing thread when, for example, one or more of the actor's associated messages are queued for processing or are in the act of being processed by a processing thread. If the associated actor is already assigned to one of the processing threads, then that processing thread may be selected for processing of the message, and the incoming message may be queued for processing by that thread. By contrast, if the associated actor is not already assigned to one of the processing threads, then a processing thread may be selected based on various factors, such as a set of priorities associated with the processing threads. The incoming message may then be queued for processing by the selected thread, and the associated actor may also be assigned to the selected thread. In some examples, when a message is queued for processing by a selected thread, a representation of the message may be inserted into a queue along with an indication of the associated actor and a queue timestamp indicating a time at which the message is queued for processing.

As set forth above, in some examples, a processing thread may be selected for processing of a message based, at least in part, on a set of priorities associated with the processing threads. In some examples, the set of priorities may be associated with workloads of the processing threads. For example, in some cases, the set of priorities may include a first priority associated with idle processing threads, a second priority associated with non-idle processing threads that have no queued messages, and a third priority associated with non-idle processing threads that have queued messages. In some examples, the priority among non-idle processing threads that have queued messages may be determined based, at least in part, on a message processing wait time. Wait time, as used herein, generally refers to an amount of time that a queued message, such as a most recently queued message, has been waiting for processing, and the wait time may be determined based, for example, on a queue timestamp of the queued message.

In some examples, a maximum wait time threshold may be specified for use in determining when to perform a migration process. In particular, in some cases, when a wait time for the most recently queued message in a particular thread queue is determined to exceed the maximum wait time threshold, a migration process may be performed on that particular processing thread (i.e., the victim thread). As part of the migration process, each message in the victim thread's queue may be de-queued from the victim thread's queue and placed in another queue, such as a temporary queue, for re-dispatching to the one of the multiple processing threads within the computing system. In some examples, the dispatcher may then re-dispatch the messages in the temporary queue by employing the same or similar criteria that are normally used to dispatch messages to a selected processing thread. In some examples, the migration may be considered successful if at least one of the actors formerly assigned to the victim thread is re-assigned to another thread as a result of the migration.

Figure 1:
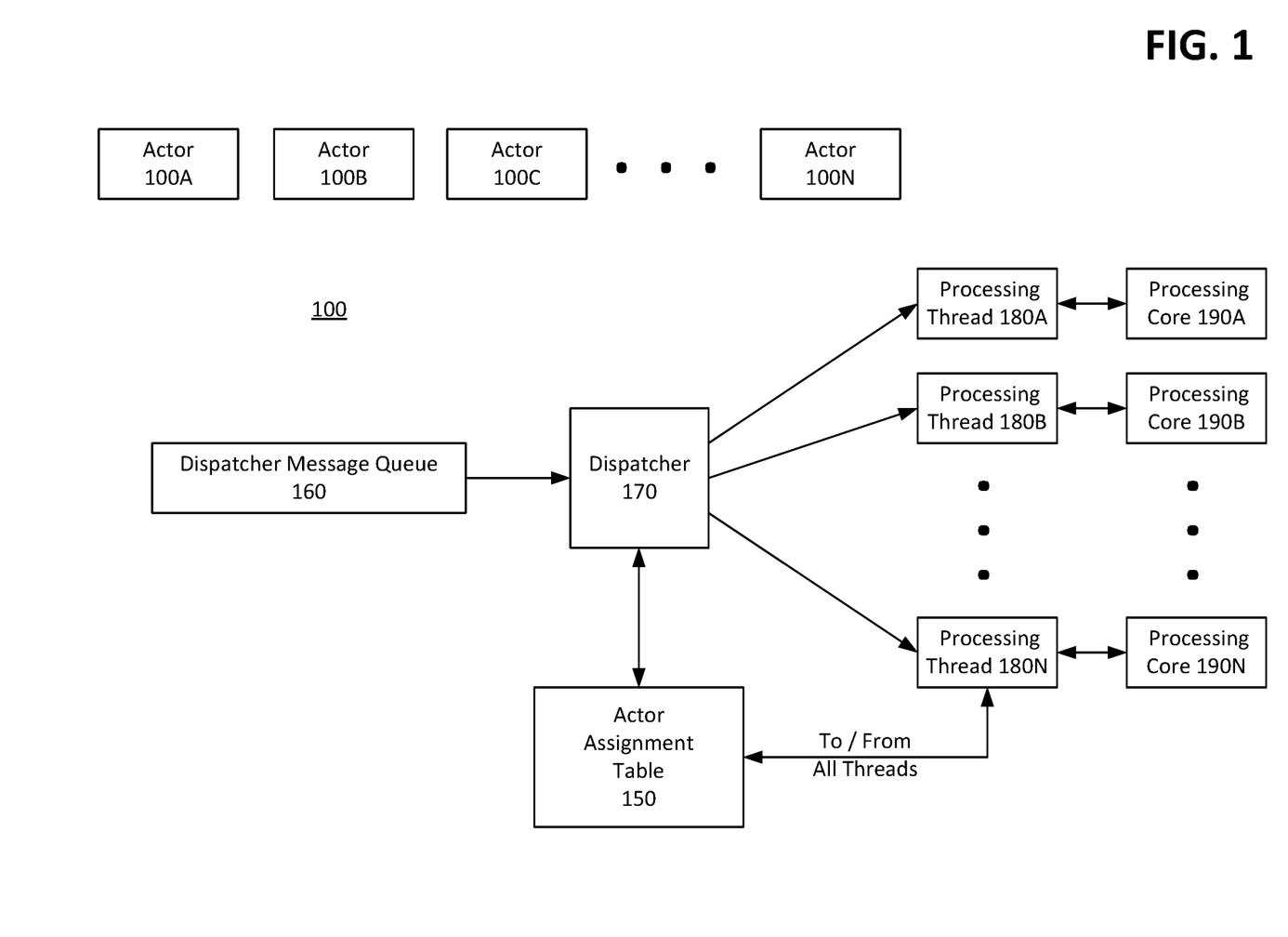
FIG. 1 is a diagram illustrating an example computing system for actor and thread message dispatching that may be used in accordance with the present disclosure.

FIG. 1 is a diagram illustrating an example computing system 100 for actor and thread message dispatching that may be used in accordance with the present disclosure. As shown, the computing system 100 includes multiple processing threads 180A-N and multiple processing cores 190A-N. Generally, processing cores 190A-N may each be processing components that are capable of reading and executing computing instructions concurrently with one another. Each of the multiple processing threads 180A-N is associated with a respective processing core 190A-N. For example, in some cases, each processing core 190A-N may concurrently execute a respective associated processing thread 180A-N. In some examples, the computing system 100 may be included within a single computing node or device. In other examples, the computing system 100 and any components therein may be distributed across multiple nodes or devices at any number of different physical locations that may be remote and/or local with respect to one another. Thus, the computing system 100 may include any number of compute nodes. A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

As also shown in FIG. 1, computing system 100 includes or is associated with multiple actors 100A-N. Generally, each of actors 100A-N may concurrently receive and respond to various messages and may sometimes communicate with other actors, such as by sending messages to other actors. In some examples, a message that is transmitted to a particular recipient actor may identify the recipient actor based on an identifier corresponding to the recipient actor. In the example of FIG. 1, incoming messages that are directed to any of actors 100A-N may be placed in a dispatcher message queue 160 associated with dispatcher 170. Dispatcher 170, which may also be referred to as a scheduler, may perform a number of operations related to dispatching of incoming messages. For example, for each incoming message, dispatcher 170 may select a particular processing thread 180A-N to process the incoming message and may queue the incoming message for processing by the selected processing thread 180A-N. Dispatcher 170 may also, for example, assign one or more of actors 180A-N to individual worker threads 180A-N. In some examples, dispatcher 170 may also perform migration processes to potentially change the thread assignments of various actors 180A-N. These and other operations that may be performed by dispatcher 170 are each described in greater detail below.

Figure 2:
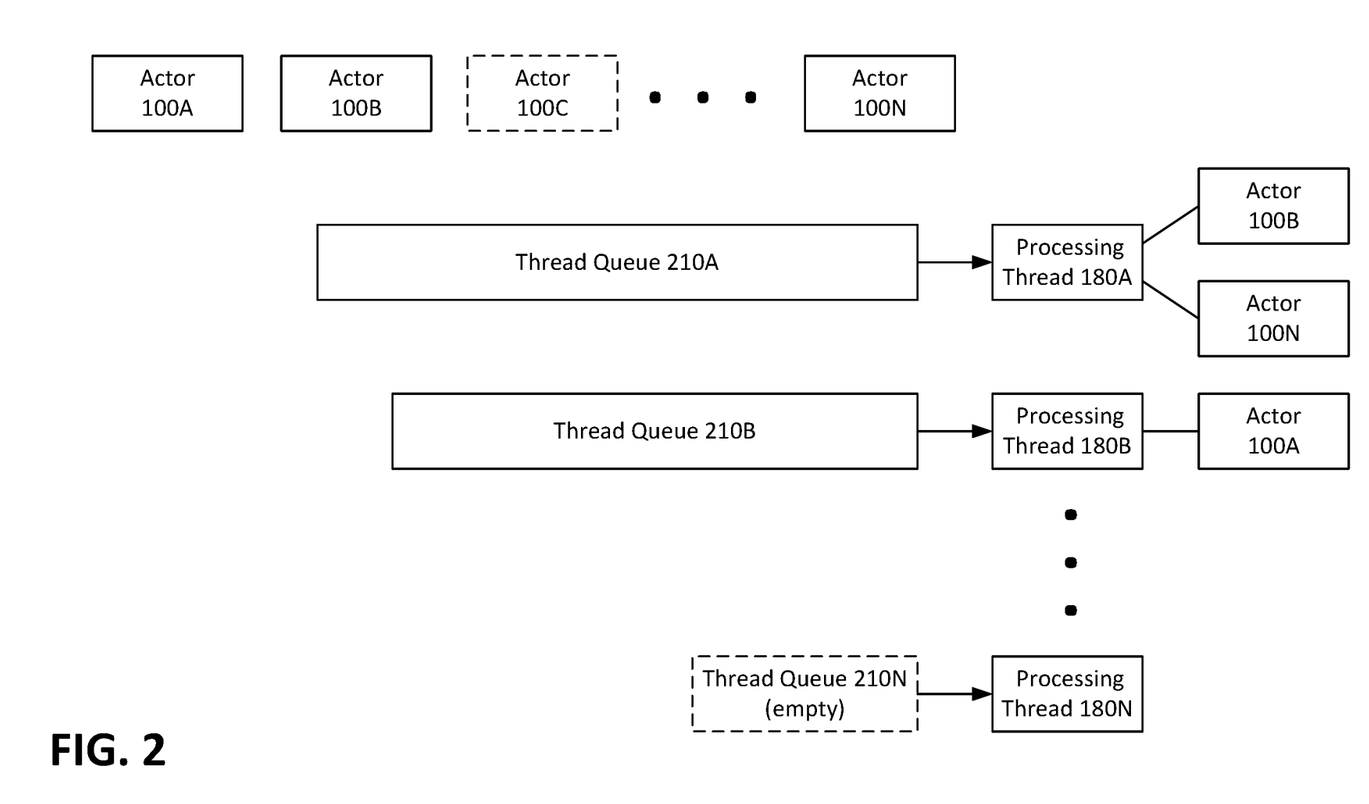
FIG. 2 is a diagram illustrating example actor and thread assignments that may be used in accordance with the present disclosure.

FIG. 2 is a diagram illustrating example actor and thread assignments that may be used in accordance with the present disclosure. In particular, as set forth above, incoming actor messages may be examined by dispatcher 170 of FIG. 1, which may select a particular processing thread 180A-N to process the incoming message. As shown in FIG. 2, each processing thread 180A-N may have an associated respective thread queue 210A-N. In the particular example of FIG. 2, thread queue 210N is empty (i.e., it includes no queued messages) as indicated by dashed lines, while thread queues 210A and 210B are not empty (i.e., they include one or more queued messages). Upon selecting a particular processing thread 180A-N to execute an incoming message, dispatcher 170 may queue the message in a respective thread queue 210A-N that is associated with the selected processing thread 180A-N. It is noted that the queueing of a message, as that phrase is used herein, refers to the ordered insertion of an identification or other representation of a message, and there is no requirement that the actual contents of the message must be inserted into the queue. In some examples, when a message is queued for processing by a selected thread, a representation of the message may be inserted into a queue along with an indication of the associated actor and a queue timestamp indicating a time at which the message is queued for processing. In some examples, thread queues 210A-N may be implemented as a ring-buffer. The ring may be pre-allocated and laid out contiguously in main memory to support cache striding for better cache performance.

In some examples, dispatcher 170 may select a thread for processing of an incoming message based on factors such as whether actor associated with the thread is already assigned to a particular thread, the identity of the thread to which the actor is assigned, and workloads of the threads. Each of these factors is described in greater detail below. An actor may be assigned to a thread when, for example, one or more of the actor's associated messages are queued for processing or are in the act of being processed by a processing thread. In the particular example of FIG. 2, it is seen that actors 100B and 100N are assigned to processing thread 180A (as indicated by the lines connecting actors 100B and 100N to processing thread 180A). Accordingly, thread queue 210A may include messages associated with actor 100B and/or actor 100N. It is seen that actor 100A is assigned to processing thread 180B (as indicated by the line connecting actors 100A to processing thread 180B). Accordingly, thread queue 210B may include messages associated with actor 100A. It is further noted that actor 100C is not currently assigned to any processing thread (as indicated by the dashed lines around actor 100C).

Figure 3:
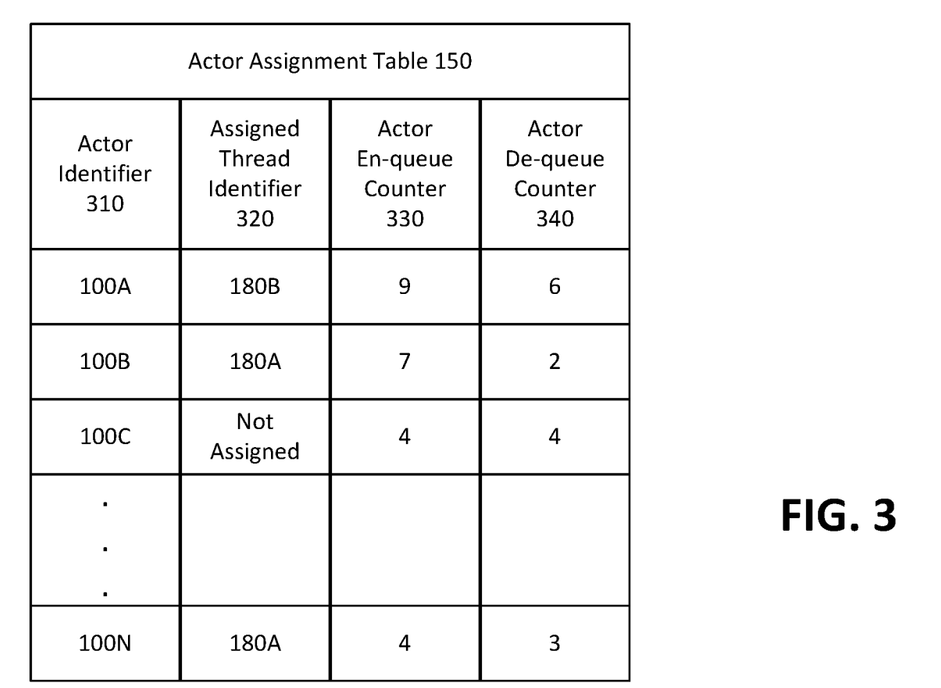
FIG. 3 is a diagram illustrating an example actor assignment table that may be used in accordance with the present disclosure.

Referring back to FIG. 1, it is seen that dispatcher 170 and processing threads 180A-N may access an actor assignment table 150, which may generally assist dispatcher 170 in the processes of selecting threads for processing of messages and performing various other dispatcher operations. FIG. 3 is a diagram illustrating an example actor assignment table 150 that may be used in accordance with the present disclosure. As shown in FIG. 3, actor assignment table 150 includes an actor identifier column 310, which may identify each of actors 100A-N and which may also serve as a key column for table 150. The table 150 further includes an assigned thread identifier column 320, which indicates whether each actor is assigned to a thread and, if assigned, identifies the thread to which the actor is assigned. When dispatcher 170 dispatches and queues an incoming message to a thread queue of a selected processing thread, dispatcher 170 may set assigned thread identifier column 320 to indicate the thread to which the message has been dispatched and queued. The actor and thread assignments indicated in table 150 correspond to those shown in FIG. 2. In particular, actors 100B and 100N are assigned to processing thread 180A. Actor 100A is assigned to processing thread 180B. Actor 100C is not currently assigned to any processing thread, as indicated by the words "Not Assigned" for actor 100C in column 320.

When dispatcher 170 dispatches and queues an incoming message to a thread queue of a selected processing thread, dispatcher 170 may also increment actor en-queue column 330 of table 150 for the row corresponding to the actor associated with the message. Additionally, when a processing thread completes processing of a message, the processing thread may increment actor de-queue column 340 of table 150 for the row corresponding to the actor associated with the message. Accordingly, actor en-queue column 330 and actor de-queue column 340 may be compared against one another to determine whether a particular actor has any associated messages that are either queued for processing or are currently being processed by a thread. In particular, if the value of en-queue counter column 330 does not match the value of de-queue counter column 340 for a particular actor, then that actor has one or more associated messages that are either queued for processing and/or are currently being processed by a thread. By contrast, if the value of en-queue counter column 330 matches the value of de-queue counter column 340 for a particular actor, then that actor does not have any associated messages that are either queued for processing or are currently being processed by a thread.

Additionally, dispatcher 170 may also consult actor assignment table 150 as part of the process of selecting a thread for processing of an incoming message. In particular, upon receiving a next incoming message from dispatcher message queue 160, dispatcher 170 may determine the actor associated with the message based on, for example, an actor identifier included within or associated the message. Dispatcher 170 may then, in some examples, use the actor identifier to obtain information for the associated actor from actor assignment table 150. In particular, in some examples, if, for the associated actor identified in actor identifier column 310, the assigned thread identifier column 320 indicates a particular assigned thread (i.e., is not null) and the values in actor en-queue column 330 and actor de-queue column 340 do not match, then dispatcher 170 may determine that the associated actor is currently assigned to a particular thread (i.e., the thread indicated in assigned thread identifier column 320). If, on the other hand, the values in actor en-queue column 330 and actor de-queue column 340 do match, dispatcher 170 may determine that the associated actor is not currently assigned to a particular thread.

In some examples, if, for an incoming message, dispatcher 170 determines that the actor associated with the message is already assigned to a particular processing thread, then then dispatcher 170 may select that processing thread for processing of the message and may queue the message for processing by that thread. In some examples, there may be a number of advantages to dispatching incoming messages associated with an actor to the same processing thread to which the associated actor is already assigned. For example, when multiple messages associated with the same actor are processed by the same processing thread, data associated with processing of those messages may be cached in a processor cache associated with the processing thread, which may not be the case when those messages are processed by different processing threads. Allowing processor threads to process messages using data that has already been cached may sometimes result in significant performance improvements, such as in comparison to scenarios in which messages are processed without the use of cached data.

By contrast, if the associated actor is not already assigned to one of the processing threads, then dispatcher 170 may select a processing thread based on various factors, such as a set of priorities associated with the processing threads. Dispatcher 170 may then queue the incoming message for processing by the selected thread and assign the associated actor to the selected thread, such as by indicating the selected thread in assigned thread identifier column 320 of actor assignment table 150.

As set forth above, in some examples, a processing thread may be selected for processing of a message based, at least in part, on a set of priorities associated with the processing threads. As will be described in detail below, the set of priorities may be used, for example, by the dispatcher to make various decisions regarding selection of processing threads, decisions regarding migration processes, and other dispatcher decisions or operations. In some examples, the set of priorities may be associated with workloads of the processing threads. For example, in some cases, the set of priorities may include a first priority associated with idle processing threads, a second priority associated with non-idle processing threads that have no queued messages, and a third priority associated with non-idle processing threads that have queued messages. In some examples, the dispatcher may first attempt to select a first priority thread for message processing, may select a second priority thread if no first priority threads are identified, and may select a third priority thread if no first priority and no second priority threads are identified.

In some examples, the priority among third priority threads (e.g., non-idle threads that have queued messages) may be determined based, at least in part, on a message processing wait time. Wait time, as used herein, refers to an amount of time that a most recently queued message has been waiting for processing, and the wait time may be determined based on a queue timestamp of the most recently queued message. For example, in some cases, dispatcher 170 may examine the queue tail (i.e., the most recently queued message) for each thread queue 210A-N and may identify the timestamp for the most recently queued message in each queue. Dispatcher 170 may then use the timestamps to determine the relative wait times for each processing thread. For example, if the timestamp is based on a continually increasing time counter, then the queue tail message with the highest time counter value may correspond to the thread with the shortest wait time. In some examples, priority among non-idle threads with queued messages may be determined by assigning the highest priority to the shortest wait time and then assigning the next highest priorities to the next shortest wait times. In some examples, if no first priority and no second priority threads are identified by the dispatcher, then the dispatcher may select a highest priority third priority thread (e.g., a non-idle thread having queued messages with the shortest wait time) for processing of a next incoming message.

It is noted that message wait time is merely one example parameter for determining a priority among non-idle threads that have queued messages and that any combination of additional or alternative parameters, such as a number of queued messages, may be used. For example, in some cases, threads with a fewer quantity messages queued for processing may be assigned a higher priority than threads with a higher quantity messages queued for processing.

Processing threads may, for example, continually process messages from their respective thread queues. The messages may be processed by, for example, de-queueing the message for the thread queue, un-marshaling the message, calling an associated message handler, and then, upon completion of processing of the message, incrementing the actor de-queue column 340 for the associated actor. In addition to queueing messages for processing by a selected processing thread, the dispatcher 170 may also route incoming messages to their associated target actors. Each individual actor may have its own respective actor message queue. The actor message queues may both grow and shrink to prevent runaway memory allocation due to, for example, temporary influxes of messages.

In some examples, dispatcher 170 may determine to perform a migration process on one or more processing threads. A thread on which a migration process is performed is referred to herein as victim thread. In some examples, a victim thread may be selected based, at least in part, on a maximum wait time threshold, which may be specified by a user or otherwise determined by the dispatcher 170. For example, in some cases, dispatcher 170 may examine the queue tail for each thread queue 210A-N and may identify the timestamp for the most recently queued message in each queue. Dispatcher 170 may then use the timestamps to identify processing threads for which a difference between the timestamp of the most recently queued message and a current time value exceeds the maximum wait time threshold. In some examples, if any such threads are identified that exceed the maximum wait time threshold, then dispatcher 170 may select the thread with the longest wait time as a candidate for the migration process.

In addition to identifying a migration candidate, the dispatcher 170 may also examine the queue tail timestamps to attempt to identify at least one viable migration target, which is a thread that does not exceed the maximum wait time threshold. In some examples, when dispatcher 170 is able to identify both a migration candidate and at least one viable migration target, then dispatcher 170 may determine to perform a migration process on the migration candidate, thereby using the migration candidate as a victim thread. By contrast, in some examples, if dispatcher 170 is unable to identify either a migration candidate and/or a viable migration target, then dispatcher 170 may defer performance of a migration process until a later time when both a migration candidate and a viable migration target are available. In some examples, the dispatcher identifications of a migration candidate and/or a viable migration target may be performed during the same queue tail searches that the examiner may employ to select threads to which to dispatch incoming messages.

The identifying of migration candidates and targets within the same searches that are used to dispatch incoming messages may improve the efficiency of the dispatcher 170 by reducing the need to perform separate searches for dispatching and migration operations. It is noted that the use of a maximum wait time threshold is merely one example technique for determining when, and upon which threads, to perform a migration process, and that other techniques may also be employed for making such migration determinations. For example, in some cases, migration may be performed on threads that exceed a maximum number of queued messages threshold and/or using other desired evaluation techniques.

Once a determination is made to perform a migration upon a victim thread, each message in the victim thread's queue may be de-queued from the victim thread's queue and placed in another queue, such as a temporary queue, for re-dispatching to the one of the multiple processing threads within the computing system. In some examples, the dispatcher 170 may then re-dispatch the messages in the temporary queue by employing the same or similar criteria described in detail above that are normally used to dispatch messages to a selected processing thread. In some examples, the migration may be considered successful if at least one of the actors formerly assigned to the victim thread is re-assigned to another thread as a result of the migration. It is noted that, in some examples, during a migration process, the actor whose message is currently being processed by the victim thread may remain assigned to the victim thread, and, therefore, each of that actor's associated messages that are queued for processing by the victim thread may also remain with the victim thread and may not be migrated to another thread.

In some examples, a migration process may provide many benefits, such as allowing actors and their associated messages to be migrated to other threads that may be idle or may otherwise have a lesser workload than the victim thread. This may result in a more even distribution of workload, thereby allowing the computing system to more fully benefit from the concurrent processing ability of multiple processing cores. Additionally, by re-assigning actors to different threads, the migration process may help to ensure that actors do not experience an unreasonable delay to have their associated messages processed.

Figure 4:
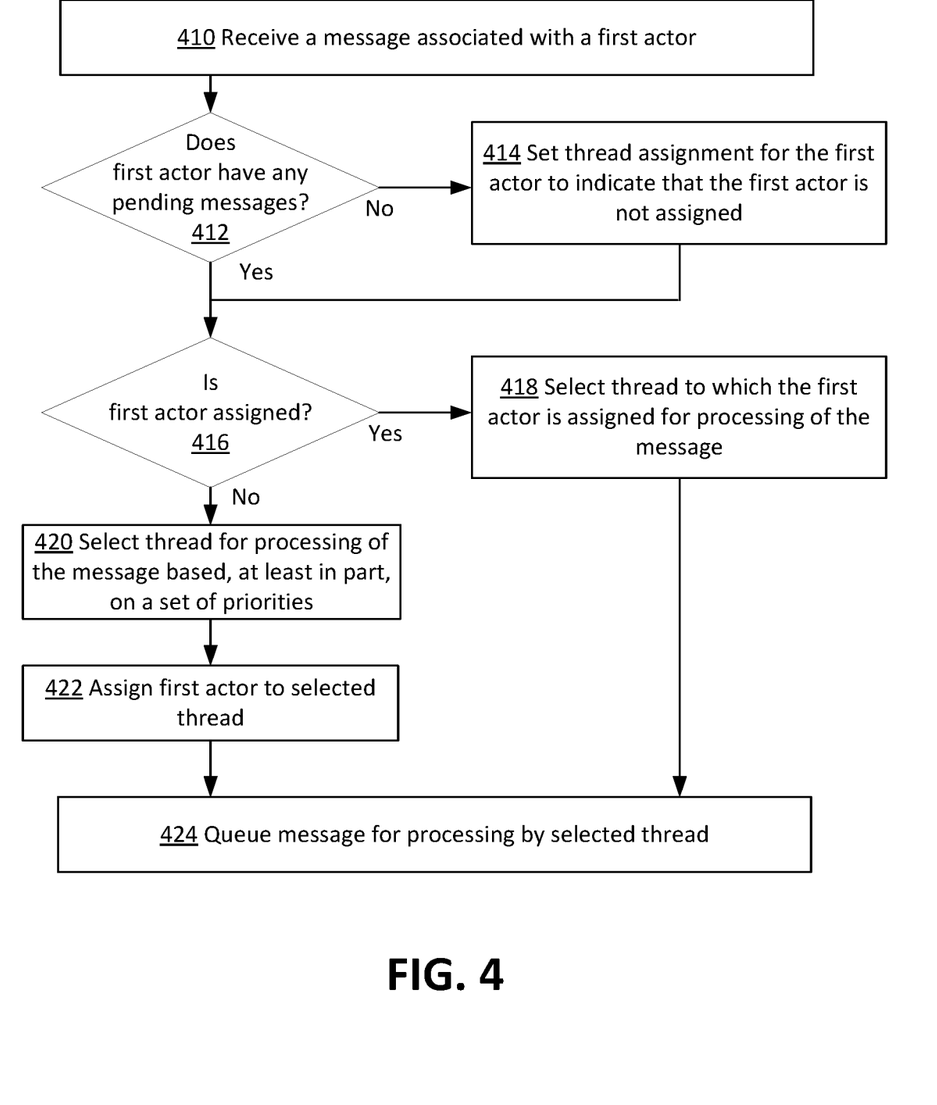
FIG. 4 is a diagram illustrating an example message dispatching process that may be used in accordance with the present disclosure.

Some example processes for dispatching and processing of messages will now be described in detail. In particular, FIG. 4 is a diagram illustrating an example message dispatching process that may be used in accordance with the present disclosure. As shown, at operation 410, a message associated with a first actor of a plurality of actors included within or otherwise associated with a computing system. For example, the message may be associated with the first actor by being addressed to the first actor and including or otherwise indicating an identifier for the first actor. In some examples, the message may be received by the dispatcher by advancing to the front of a dispatcher message queue.

At operation 412, it is determined whether the actor associated with the message (i.e., the first actor in this example) has any associated pending messages, which are messages that are either queued for processing by a thread or are being processed by a thread. For example, the dispatcher may examine an actor assignment table 150 of FIG. 3 to find pending message information associated with the first actor. In some cases, the dispatcher may examine actor en-queue column 330 and actor de-queue column 340 to determine whether the values in these columns for the first actor match one another. In particular, dispatcher 170 may examine the values of columns 330 and 340 for the row having an identifier of the first actor as indicated by actor identifier column 310. If the values in columns 330 and 340 for the first actor do not match one another, then dispatcher 170 may determine that the first actor has at least one pending message. When the actor has at least one pending message, the process may proceed directly to operation 416 without performing operation 414.

By contrast, if the values in columns 330 and 340 for the first actor do match one another, then dispatcher 170 may determine that the first actor does not have any pending messages. If the first actor does not have any pending messages, then, at operation 414, a thread assignment for the first actor may be set to indicate that the first actor is not assigned to any processing thread. For example, the dispatcher may set assigned thread identifier column 320 of the actor assignment table 150 to indicate that the first actor is not assigned to any processing thread. It is noted that, in some examples, such as when the first actor has not been previously assigned to any processing thread, the assigned thread identifier column 320 may already indicate that the first actor is not assigned to any processing thread, and operation 414 may be skipped or may include a redundant setting (or verifying of a prior setting) to indicate that the first actor is not assigned to any processing thread.

At operation 416, it is determined whether the first actor is assigned to a processing thread. For example, the dispatcher may examine the assigned thread identifier column 320 of the actor assignment table 150 to determine whether the first actor is assigned to a processing thread. If, for the row corresponding to the first actor as indicated in actor identifier column 310, the assigned thread identifier column 320 includes an identifier of a processing thread, then dispatcher 170 may determine that the first actor is assigned to a processing thread. By contrast, if, for the row corresponding to the first actor as indicated in actor identifier column 310, the assigned thread identifier column 320 does not includes an identifier of a processing thread (e.g., includes words such as "not assigned" or "null"), then dispatcher 170 may determine that the first actor is not assigned to a processing thread.

If, at operation 416, it is determined that the first actor is assigned to a processing thread, then, at operation 418, the assigned thread may be selected for processing of the message. On the other hand, if, at operation 416, it is determined that the first actor is not assigned to a processing thread, then, at operation 420, the dispatcher may select a thread for processing of the message based, at least in part, on a set of priorities. As set forth above, in some cases, the set of priorities may be associated with the plurality of processing threads and, in particular, workloads of the plurality of processing threads. For example, in some cases, the set of priorities may include a first priority associated with idle processing threads, a second priority associated with non-idle processing threads that have no queued messages, and a third priority associated with non-idle processing threads that have queued messages. In some examples, the dispatcher may first attempt to select a first priority thread for message processing, may select a second priority thread if no first priority threads are identified, and may select a third priority thread if no first priority and no second priority threads are identified. The priority among third priority threads (e.g., non-idle threads that have queued messages) may, for example, be determined based, at least in part, on message processing wait times. In some examples, if no first priority and no second priority threads are identified by the dispatcher, then the dispatcher may select a highest priority third priority thread (e.g., a non-idle thread having queued messages with the shortest wait time) for processing of a next incoming message. Some example priorities for selecting of a thread for processing of a message are described in greater detail below with reference to FIGS. 6 and 7.

At operation 422, the actor is assigned to the thread that is selected at operation 418. For example the dispatcher may update the assigned thread identifier column 320 for the row corresponding to the first actor as indicated in actor identifier column 310 to include an identifier of the selected processing thread.

At operation 424, the message may be queued for processing by the selected thread. For example, a representation of the message may be inserted into a thread queue 210A-N of the selected processing thread along with an indication of the actor associated with the message (i.e., the first actor) and a queue timestamp indicating a time at which the message is queued for processing by the selected processing thread.

Figure 5:
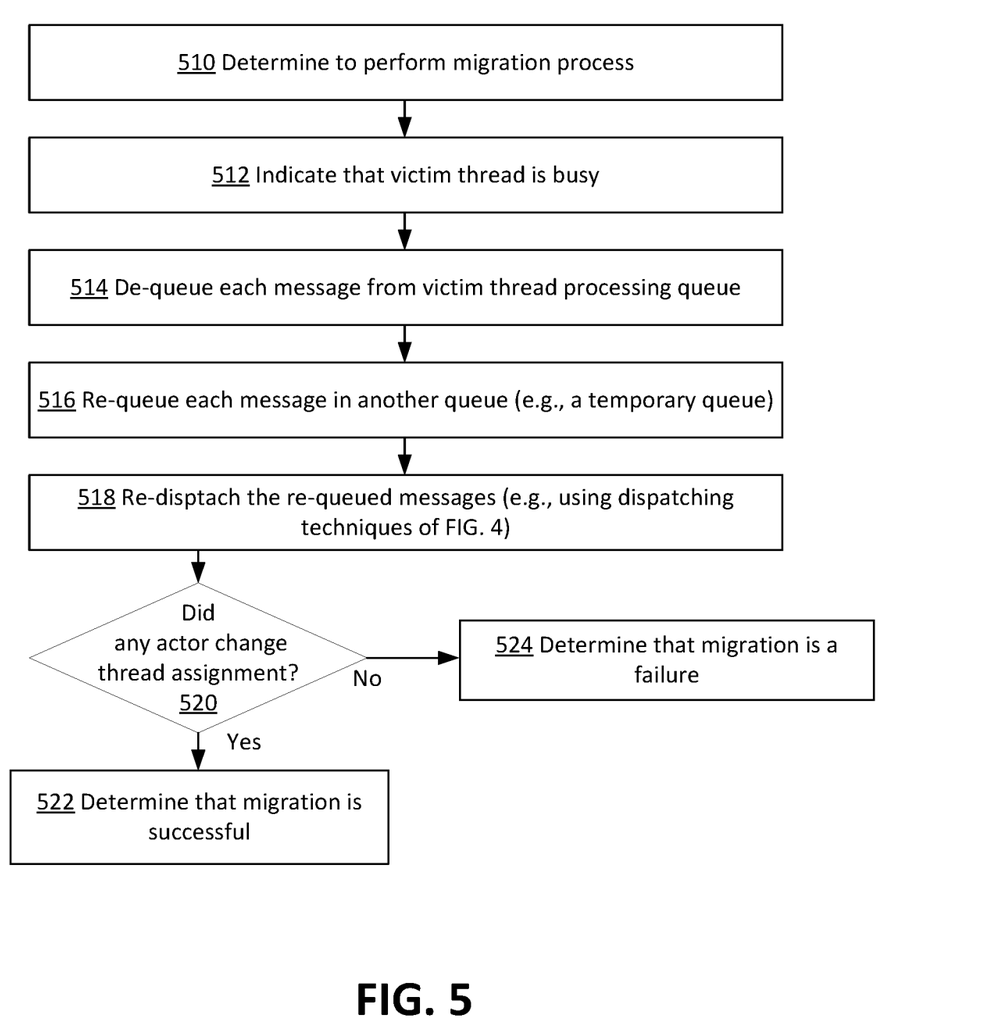
FIG. 5 is a diagram illustrating an example thread migration process that may be used in accordance with the present disclosure.

Thus, some example message dispatching techniques are shown in FIG. 4. As set forth above, after dispatching of messages, one or more processing threads may become delayed such that the wait times for processing of dispatched messages becomes undesirably long. In these and other scenarios, it may sometimes be advantageous to perform a migration process on one or more processing threads. FIG. 5 is a diagram illustrating an example thread migration process that may be used in accordance with the present disclosure. At operation 510, a determination is made to perform a migration process. In some examples, a determination may be made to perform a migration process by selecting a victim thread, which is a thread on which the migration process is performed. Also, in some examples, a determination may be made to perform a migration process on the victim thread based, at least in part, on a maximum wait time threshold. For example, the victim thread may be a processing thread that has a longest wait time that meets or exceeds a maximum wait time threshold and has at least one queued message. Also, in some examples, a determination may be to perform a migration process based, at least in part, on a determination that there is at least one viable migration target thread that does not exceed the maximum wait time threshold. These and other example conditions for determining to perform a migration process are described in greater detail below with reference to FIG. 7.

At operation 512, an indication is made that the thread on which the migration process is being performed (i.e., the victim thread) is busy. As will be described in greater detail below, indicating the victim thread as busy may, for example, cause the workload of the victim thread to be evaluated differently relative to other non-busy threads and may, in some examples, may reduce the likelihood that victim thread will be selected to process incoming messages relative to non-busy threads. In some examples, the victim thread may be un-marked or un-indicated as busy when the victim thread completes processing of the message being processed when marked as busy. Also, in some examples, each processing thread may have an associated flag or other indicator that may be used to indicate whether the processing thread is busy.

At operation 514, each message in the victim thread's queue may be de-queued from the victim thread's queue, and, at operation 516, may be placed in another queue, such as a temporary queue, for re-dispatching to the one of the multiple processing threads within the computing system. At operation 518, the re-queued messages in the other queue may then be re-dispatched. As set forth above, in some examples, the re-queued messages may be re-dispatched by employing the same or similar criteria normally used to dispatch messages to a selected processing thread, such as the operations described in detail above with reference to FIG. 4. For example, the re-dispatching of a re-queued message may include selecting a processing thread to which an associated actor is assigned or selecting a processing thread based at least in part on the set of priorities.

At operation 520, it is determined whether the assignment of any actor that was formerly assigned to the victim thread at the time of initiation of the migration process changed to be re-assigned to another thread as a result of the migration process. In some examples, each actor may have an associated flag that may be used to indicate whether the actor has been re-assigned, for example, as a result of a migration process. For example, in some cases, if an actor has been re-assigned as a result of a migration process, then the actor's flag may be set. The dispatcher may then, at the conclusion of the migration process, determine whether any flags have been set to indicate that any actors have been re-assigned. If one or more of the actors formerly assigned to the victim thread is re-assigned to another thread, then, at operation 522, it is determined that the migration process is successful. By contrast, if none of the actors formerly assigned to the victim thread are re-assigned to another thread, then, at operation 524, it is determined that the migration process is a failure. In some examples, if a migration attempt fails, then a migration on the same victim thread or another thread may sometimes be re-attempted at a later time. For example, in some cases, after dispatching of a next incoming message, the processing threads within the system may be re-evaluated for migration, such as described in greater detail below with reference to FIG. 7. As set forth above, in some examples, during a migration process, the actor whose message is being processed by the victim thread when the migration process is initiated may remain assigned to the victim thread, and, therefore, each of that actor's associated messages that are queued for processing by the victim thread may remain with the victim thread and may not be migrated to another thread.

Figure 6:
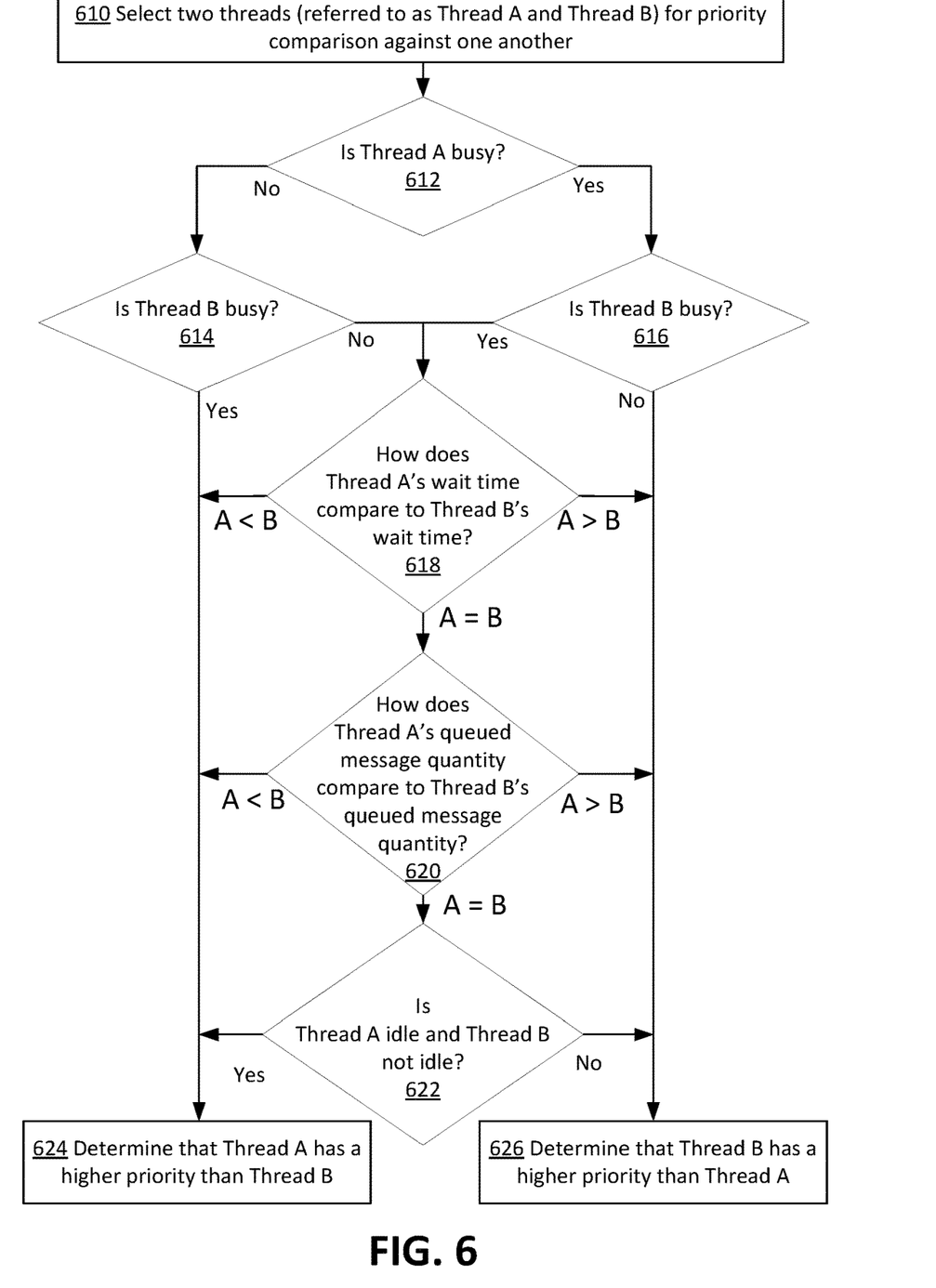
FIG. 6 is a diagram illustrating an example thread priority comparison process that may be used in accordance with the present disclosure.

FIG. 6 is a diagram illustrating an example thread priority comparison process that may be used in accordance with the present disclosure. At operation 610, two processing threads (referred to, in the example of FIG. 6, as Thread A and Thread B) are selected for priority comparison against one another. At operation, 612, it is determined whether Thread A is busy. As set forth above, in some examples, a thread may be marked is busy when a determination is made to perform a migration process on the thread, such as set forth above with reference to FIG. 5. If, at operation 612, it is determined that Thread A is not busy, then, at operation 614, it is determined whether Thread B is busy. If, at operation 614, it is determined that Thread B is busy, then, at operation 624, Thread A is determined to have a higher priority than Thread B. By contrast, if, at operation 614, it is determined that Thread B is also not busy, then the process proceeds to operation 618.

If, at operation 612, it is determined that Thread A is busy, then, at operation 616, it is determined whether Thread B is busy. If, at operation 616, it is determined that Thread B is not busy, then, at operation 626, Thread B is determined to have a higher priority than Thread A. By contrast, if, at operation 616, it is determined that Thread B is also busy, then the process proceeds to operation 618.

At operation 618, the wait time of Thread A is compared against the wait time of Thread B. As set forth above, in some cases, the dispatcher 170 may examine the queue tail (i.e., the most recently queued message) for Threads A and B and may identify the timestamp for the most recently queued message in each queue. The dispatcher may then use the timestamps to determine the relative wait times for each processing thread. For example, if the timestamp is based on a continually increasing time counter, then the queue tail message with the higher time counter value may correspond to the thread with the lesser wait time. If, at operation 618, it is determined that Thread A has a greater wait time than Thread B, then, at operation 626, Thread B is determined to have a higher priority than Thread A. If, at operation 618, it is determined that Thread A has a lesser wait time than Thread B, then, at operation 624, Thread A is determined to have a higher priority than Thread B. If, at operation 618, it is determined that Thread A and Thread B have equal wait times, then the process proceeds to operation 620.

At operation 620, the quantity of queued messages for Thread A is compared against the quantity of queued messages for Thread B. For example, the dispatcher 170 may examine the processing queues for Threads A and B to determine a quantity of messages in each queue. If, at operation 620, it is determined that Thread A has a greater quantity of queued messages than Thread B, then, at operation 626, Thread B is determined to have a higher priority than Thread A. If, at operation 620, it is determined that Thread A has a lesser quantity of queued messages than Thread B, then, at operation 624, Thread A is determined to have a higher priority than Thread B. If, at operation 618, it is determined that Thread A and Thread B have equal quantities of queued messages, then, then the process proceeds to operation 622.

At operation 622, it is determined whether Thread A is idle and Thread B is not idle. If the determination made at operation 622 is true (i.e., Thread A is idle and Thread B is not idle), then, at operation 624, Thread A is determined to have a higher priority than Thread B. By contrast, if the determination made at operation 622 is false, then, at operation 626, Thread B is determined to have a higher priority than Thread A. In some examples, each processing thread may have an associated flag or other indicator that may be used to indicate whether the processing thread is idle.

Figure 7:
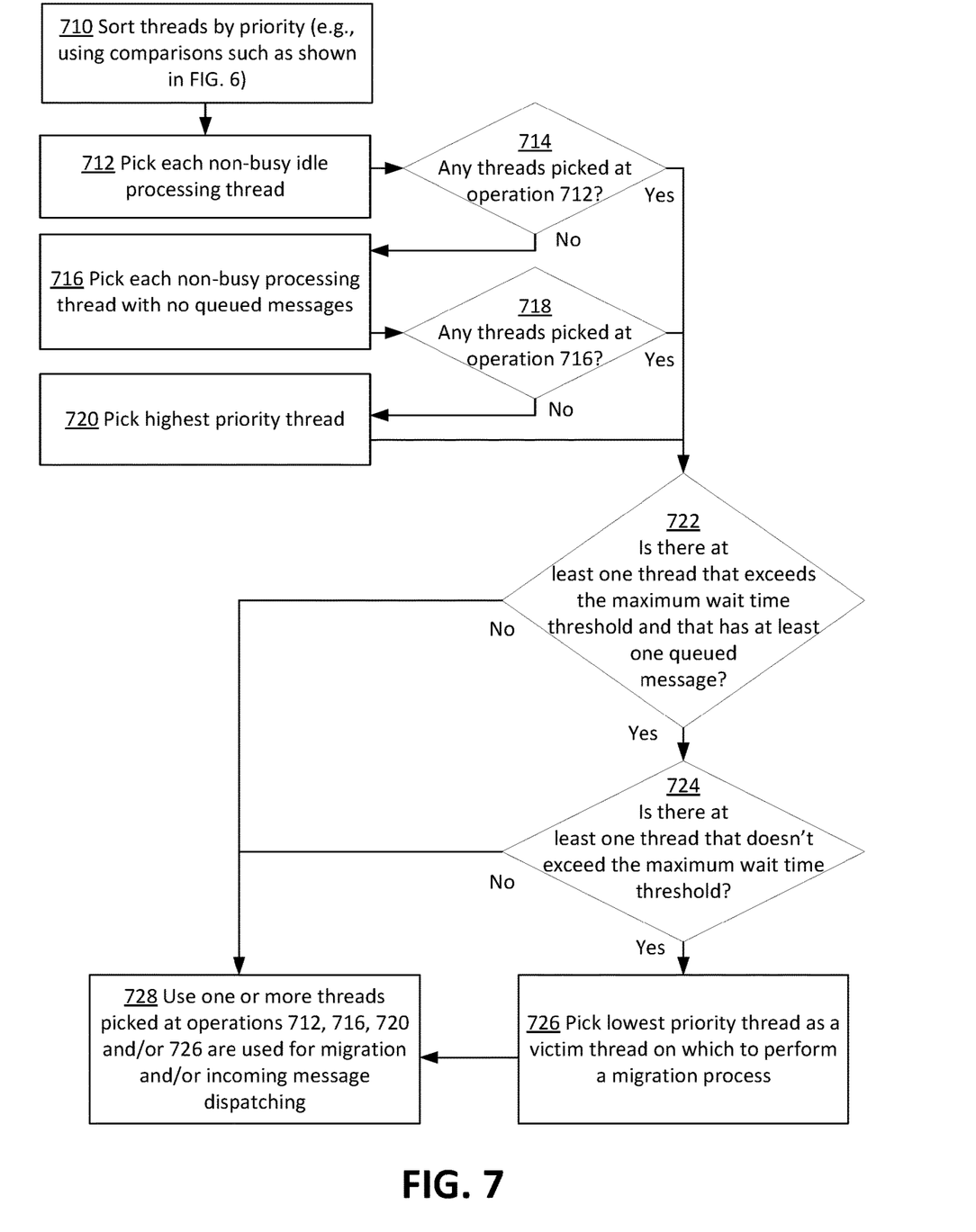
FIG. 7 is a diagram illustrating an example thread evaluation process that may be used in accordance with the present disclosure.

Thus, in some examples, a process such as shown in FIG. 6 may be employed to determine relative thread priorities with respect to one another. As set forth above, these priority determinations may be used, for example, to select processing threads to which to dispatch and queue incoming messages for processing, to select victim threads upon which to perform a migration process, and for other reasons. Some example uses for thread priority comparisons such as those shown in FIG. 6 will now be described in detail. In particular, FIG. 7 is a diagram illustrating an example thread evaluation process that may be used in accordance with the present disclosure. As shown, at operation 710, processing threads within the computing system are sorted by priority. For example, operation 710 may include performing the thread priority comparison, such as shown in FIG. 6, upon one or more of the processing threads within the computing system against one or more other of the processing threads within the computing system. In some examples, each processing thread within the computing system may be compared against each other processing thread within the computing system to sort their relative priorities. However, there may be circumstances where it is unnecessary and/or undesirable to compare each processing thread within the computing system against each other processing thread within the computing system. For example, if, during the sorting process, it becomes known that two threads are both non-busy and idle, it may not be necessary to explicitly compare those two threads, as their priorities may sometimes both be determined to be equivalent based on their non-busy and idle status.

At operation 712, each non-busy idle processing thread within the computing system is picked. At operation 714, it is determined whether any threads are picked at operation 712. If, at operation 714, it is determined that one or more threads are picked, then the process proceeds to operation 722. By contrast, if, at operation 714, it is determined that no threads are picked, then then the process proceeds to operation 716.

At operation 716, each non-busy processing thread with no queued messages within the computing system is picked. At operation 718, it is determined whether any threads are picked at operation 716. If, at operation 718, it is determined that one or more threads are picked, then the process proceeds to operation 722. By contrast, if, at operation 718, it is determined that no threads are picked, then then the process proceeds to operation 720.

At operation 720, only the highest priority thread within the computing system is picked. For example, if the computing system includes no non-busy idle threads or non-busy threads with no queued messages, then, in some cases, a non-busy thread having a shortest wait time for its queued messages may be sometimes be selected depending upon the particular thread priority criteria that are being employed by the system.

At operation 722, it is determined whether there is at least one processing thread that meets or exceeds the maximum wait time threshold and that has at least one queued message. If there is not at least one processing thread that meets or exceeds the maximum wait time threshold and that has at least one queued message, the process proceeds to operation 728. If, on the other hand, there is at least one processing thread that meets or exceeds the maximum wait time threshold and that has at least one queued message, then the process proceeds to operation 724.

At operation 724, it is determined whether there is at least one thread that does not exceed the maximum wait time threshold. As set forth above, a thread that does not exceed the maximum wait time threshold may be referred to herein as a viable migration candidate. If there is not at least one processing thread that does not exceed the maximum wait time threshold, then the process proceeds to operation 728. If, on the other hand, there is at least one processing thread that does not exceed the maximum wait time threshold, then the process proceeds to operation 726. At operation 726, a lowest priority processing thread is picked as a victim thread on which to perform a migration process.

At operation 728, the one or more threads picked at operation 712, 716, 720 and/or 724 are used for migration and/or incoming message dispatching. For example, if a thread is picked as a victim thread at operation 724, then a migration process may be performed on the picked victim thread, such as described in detail above with reference to FIG. 5. Additionally, the dispatcher may select one or more of the threads picked at operation 712, 716 or 720 as threads to which to dispatch an incoming message for processing of the incoming message, such as described in detail above with reference to FIG. 4. For example, if any non-busy idle threads are picked at operation 712, then the dispatcher may select one of those threads for processing of a next message whose associated actor is not assigned to another thread. If no non-busy idle threads are picked, then the dispatcher may instead select a non-busy idle thread with no queued messages if any such threads are picked at operation 716. If no threads are picked at operations 712 or 716, then the dispatcher may instead select a highest priority thread picked at operation 720.

Figure 8:
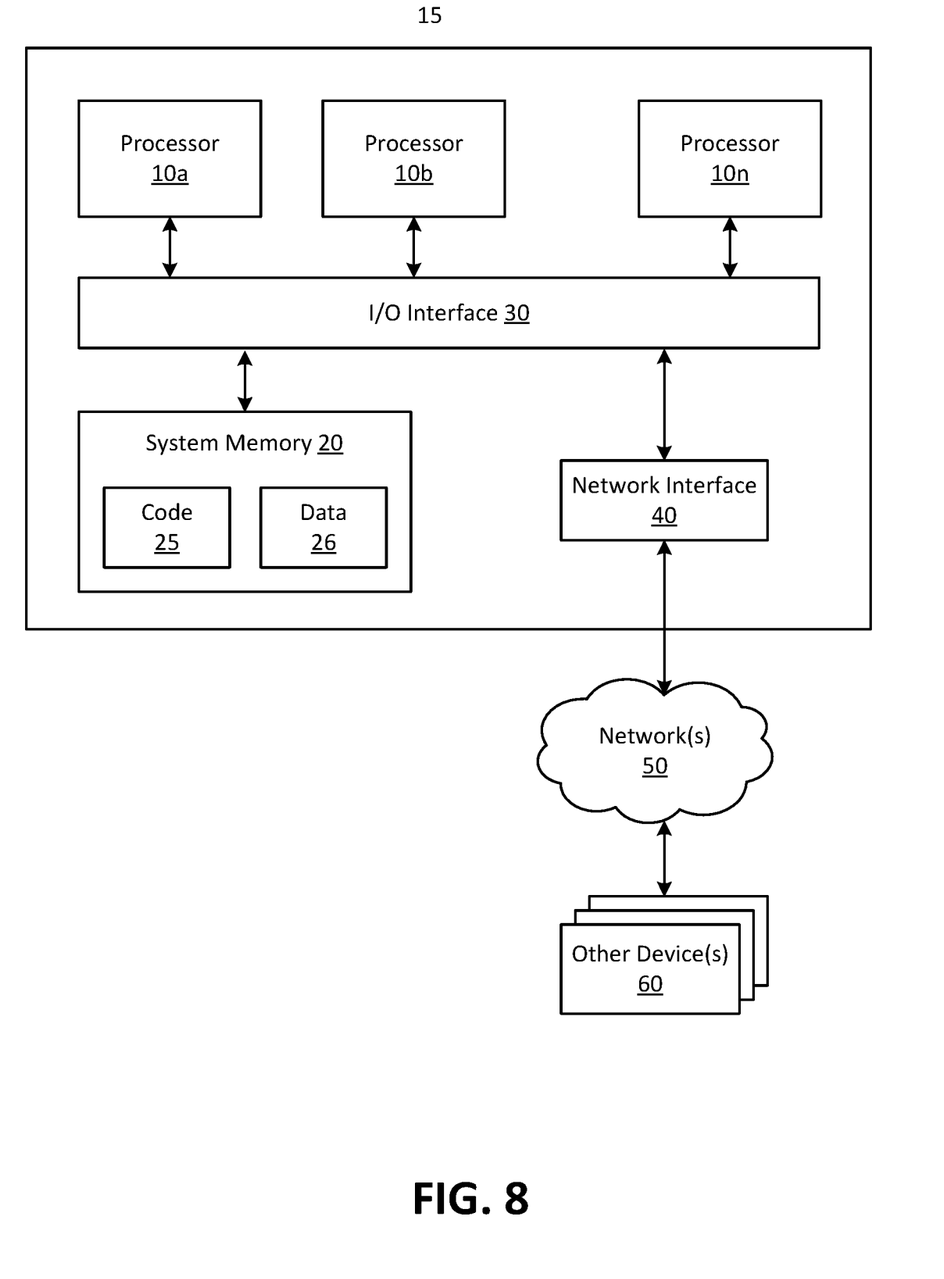
FIG. 8 is a diagram illustrating an example computing system that may be used in accordance with the present disclosure.

In at least some embodiments, one or more compute nodes that implement a portion or all of one or more of the technologies described herein may include or may be associated with a general-purpose computer system that includes or is configured to access one or more computer-accessible media. FIG. 8 depicts a general-purpose computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more processors
one or more memories that store a set of instructions, which when executed by the one or more processors, causes the one or more processors to perform operations comprising:
receiving a first message associated with a first actor of a plurality of actors associated with a computing system;
determining that the first actor is not assigned to any of a plurality of processing threads within the computing system; and
selecting, based at least in part on a set of priorities associated with workloads of the plurality of processing threads, a first processing thread for processing of the first message, wherein the set of priorities comprises a first priority associated with idle processing threads, a second priority associated with non-idle processing threads that have no messages queued for processing, and a third priority associated with non-idle processing threads that have messages queued for processing, and wherein the non-idle processing threads that have messages queued for processing are prioritized based, at least in part, on message processing wait times.

2. The system of claim 1, wherein the operations further comprise determining to perform a migration on the first processing thread based, at least in part, on a maximum wait time threshold.

3. The system of claim 1, wherein the first actor is assigned to one of the plurality of processing threads when the first actor has at least one of an associated message that is queued for processing or an associated message that is being processed by the one of the plurality of processing threads.

4. The system of claim 1, wherein the operations further comprise queueing the first message for processing by the first processing thread.

5. The system of claim 1, wherein the operations further comprise assigning a timestamp indicating a time at which the first message is queued for processing.

6. The system of claim 1, wherein each processing thread of the plurality of processing threads is associated with a respective processing core of a plurality of processing cores in the computing system.

7. The system of claim 1, wherein the operations further comprise performing a migration on the first processing thread, wherein the migration comprises:
de-queueing second messages from a queue of the first processing thread;
re-queueing the second messages into another message queue; and
re-dispatching each of the second messages, wherein the re-dispatching of each of the second messages comprises selecting a processing thread to which an associated actor is assigned or selecting a processing thread based at least in part on a set of priorities.

8. A method comprising:
receiving a first message associated with a first actor of a plurality of actors associated with a computing system;
determining that the first actor is not assigned to any of a plurality of processing threads within the computing system; and
selecting, based at least in part on a set of priorities associated with workloads of the plurality of processing threads, a first processing thread for processing of the first message, wherein the set of priorities comprises a first priority associated with idle processing threads, a second priority associated with non-idle processing threads that have no messages queued for processing, and a third priority associated with non-idle processing threads that have messages queued for processing, and wherein the non-idle processing threads that have messages queued for processing are prioritized based, at least in part, on message processing wait times.

9. The method of claim 8, further comprising determining to perform a migration on the first processing thread based, at least in part, on a maximum wait time threshold.

10. The method of claim 8, wherein the first actor is assigned to one of the plurality of processing threads when the first actor has at least one of an associated message that is queued for processing or an associated message that is being processed by the one of the plurality of processing threads.

11. The method of claim 8, further comprising performing a migration on the first processing thread, wherein the migration comprises:
de-queueing second messages from a queue of the first processing thread;
re-queueing the second messages into another message queue; and
re-dispatching each of the second messages, wherein the re-dispatching of each of the second messages comprises selecting a processing thread to which an associated actor is assigned or selecting a processing thread based at least in part on a set of priorities.

12. A non-transitory computer-readable medium having stored thereon a set of instructions, which when performed by one or more processors, causes the one or more processors to perform operations comprising:
receiving a first message associated with a first actor of a plurality of actors associated with a computing system;
determining that the first actor is not assigned to any of a plurality of processing threads within the computing system; and
selecting, based at least in part on a set of priorities associated with workloads of the plurality of processing threads, a first processing thread for processing of the first message, wherein the set of priorities comprises a first priority associated with idle processing threads, a second priority associated with non-idle processing threads that have no messages queued for processing, and a third priority associated with non-idle processing threads that have messages queued for processing, and wherein the non-idle processing threads that have messages queued for processing are prioritized based, at least in part, on message processing wait times.

13. The non-transitory computer-readable medium of claim 12, wherein the operations further comprise determining to perform a migration on the first processing thread based, at least in part, on a maximum wait time threshold.

14. The non-transitory computer-readable medium of claim 12, wherein the operations further comprise queueing the first message for processing by the first processing thread.

15. The non-transitory computer-readable medium of claim 12, wherein the operations further comprise assigning a timestamp indicating a time at which the first message is queued for processing.

16. The non-transitory computer-readable medium of claim 12, wherein each processing thread of the plurality of processing threads is associated with a respective processing core of a plurality of processing cores.

17. The non-transitory computer-readable medium of claim 12, wherein the operations further comprise performing a migration on the first processing thread, wherein the migration comprises:
- de-queueing second messages from a queue of the first processing thread;
- re-queueing the second messages into another message queue; and
- re-dispatching each of the second messages, wherein the re-dispatching of each of the second messages comprises selecting a processing thread to which an associated actor is assigned or selecting a processing thread based at least in part on a set of priorities.

18. The method of claim 8, further comprising queueing the first message for processing by the first processing thread.

19. The method of claim 8, further comprising assigning a timestamp indicating a time at which the first message is queued for processing.

20. The method of claim 8, wherein each processing thread of the plurality of processing threads is associated with a respective processing core of a plurality of processing cores.

* * * * *